United States Patent
Nikkanen et al.

(10) Patent No.: US 9,591,195 B2
(45) Date of Patent: Mar. 7, 2017

(54) PLATFORM ARCHITECTURE FOR ACCELERATED CAMERA CONTROL ALGORITHMS

(71) Applicant: Intel Corporation, Santa Clara, CA (US)

(72) Inventors: Jarno Nikkanen, Kangasala (FI); Liron Ain-Kedem, Kiryat Tivon (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/327,933

(22) Filed: Jul. 10, 2014

(65) Prior Publication Data

US 2016/0014312 A1 Jan. 14, 2016

(51) Int. Cl.
| H04N 5/76 | (2006.01) |
| H04N 5/225 | (2006.01) |
| H04N 5/232 | (2006.01) |
| H04N 5/235 | (2006.01) |

(52) U.S. Cl.
CPC .......... *H04N 5/2257* (2013.01); *H04N 5/235* (2013.01); *H04N 5/2353* (2013.01); *H04N 5/23203* (2013.01); *H04N 5/23229* (2013.01)

(58) Field of Classification Search
CPC ............. H04N 19/00163; H04N 19/46; H04N 19/107; H04N 5/23212; H04N 5/2257
USPC ............................... 348/222.1, 347, 348, 353
See application file for complete search history.

(56) References Cited

U.S. PATENT DOCUMENTS

| 2007/0086765 A1 | 4/2007 | Nakamura |
| 2010/0045848 A1* | 2/2010 | Sugimoto .......... H04N 5/23212 348/347 |
| 2011/0109758 A1* | 5/2011 | Liang ............... H04N 19/00163 348/222.1 |
| 2011/0110656 A1 | 5/2011 | Hamada |
| 2014/0036139 A1 | 2/2014 | Hamada |

OTHER PUBLICATIONS

Schlag et al., "Implementation of Automatic Focusing Algorithms for a Computer Vision System with Camera Control"; Carnegie Mellon University, School of Computer Science, Research Showcase @ CMU, Robotics Institute; Aug. 15, 1983; 90 pages total.
International Search Report and Written Opinion, mailed Aug. 24, 2015, for PCT Patent Application No. PCT/US15/31588.

* cited by examiner

*Primary Examiner* — Antoinette Spinks
(74) *Attorney, Agent, or Firm* — Green, Howard & Mughal LLP

(57) ABSTRACT

Camera control architecture and methods that distribute control responsibilities across hard real-time and soft real-time parts. The operation of digital camera control algorithms can be made less sensitive to timing fluctuations among the various systems within a device platform that includes a camera module (CM) and/or image signal processing (ISP) pipeline. Real-time dispatch of control parameter values may be offloaded from a controller responsible for generating control parameter values. With relaxed timing requirements, camera control algorithm libraries may be developed independent of lower-level hardware responsible for managing the dispatch of control parameter values to the CM and/or ISP.

22 Claims, 8 Drawing Sheets

PLATFORM ARCHITECTURE FOR ACCELERATED CAMERA CONTROL ALGORITHMS

BACKGROUND

A digital camera is a component often included in commercial electronic media device platforms. Digital cameras are now available in wearable form factors (e.g., video capture earpieces, video capture headsets, video capture eyeglasses, etc.), as well as embedded within smartphones, tablet computers, and notebook computers, etc. The transformation of image data collected by a camera module (e.g., camera sensor and optics) into values suitable for reproduction and/or display poses a challenging problem for camera control algorithms (CCA) implemented by device platforms. Exemplary CCA algorithms include automatic white balancing (AWB), automatic focus (AF), and automatic exposure control (AEC), often referred to together as "3A" control. AEC and AF involve the control of camera module hardware (CM), while AWB involves the control of the image signal processing (ISP) pipeline downstream of the CM. Exemplary CM control parameters include aperture size, shutter speed, neutral density (ND) filter control, flash power, analog gain (AG), and digital gain (DG). Exemplary ISP control parameters include white balancing gains, lens shading correction (LSC) gains, and noise suppression.

High quality video and preview need fast, smooth, and flicker-free convergence of brightness or other similar video quality factors. A device platform user's experience with respect to video camera function may therefore depend on determination of an optimal parameter value by CCA, as well as the dynamic control of the parameter over a sequence of frames. Frame sequences may be presented "live" to a preview screen of the platform, and/or encoded and stored as recorded video. In the example of AEC, a flicker or jump in brightness in a digital camera screen may be visible to a user in a preview screen or recorded video if a 3A controller performing the AEC calculations is unable to dynamically update CM parameter values in synchronization with the collection of image data frames by the CM.

If the frequency of parameter value updates made available to a CM, or image signal processor, is not sufficient to accommodate a given frame rate, then a slip occurs. There may be a slip for example when a CM register is not updated in time for the new register setting to take effect on the sensor before a next image data frame is exposed by the CM. Timing of CM parameter value updates is typically limited by exposure because parameters such as AG or DG may be changed subsequent to exposure time. If there is a timing slip, multiple frames may then be exposed with a stale register state and when the register is subsequently updated without having had the benefit of an incremental exposure time convergence, the control parameter value written may cause a sufficiently dramatic change in the image data that video quality suffers. Avoiding slips between a 3A controller and a CM or ISP becomes all the more challenging with the trends toward higher frame rates and lower CCA processor power consumption limits.

Platform architectures and techniques capable of accelerated CCA would therefore be advantageous, for example to improve video quality and thereby enhance performance of camera functions.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION OF EXEMPLARY EMBODIMENTS

Figure 1A:
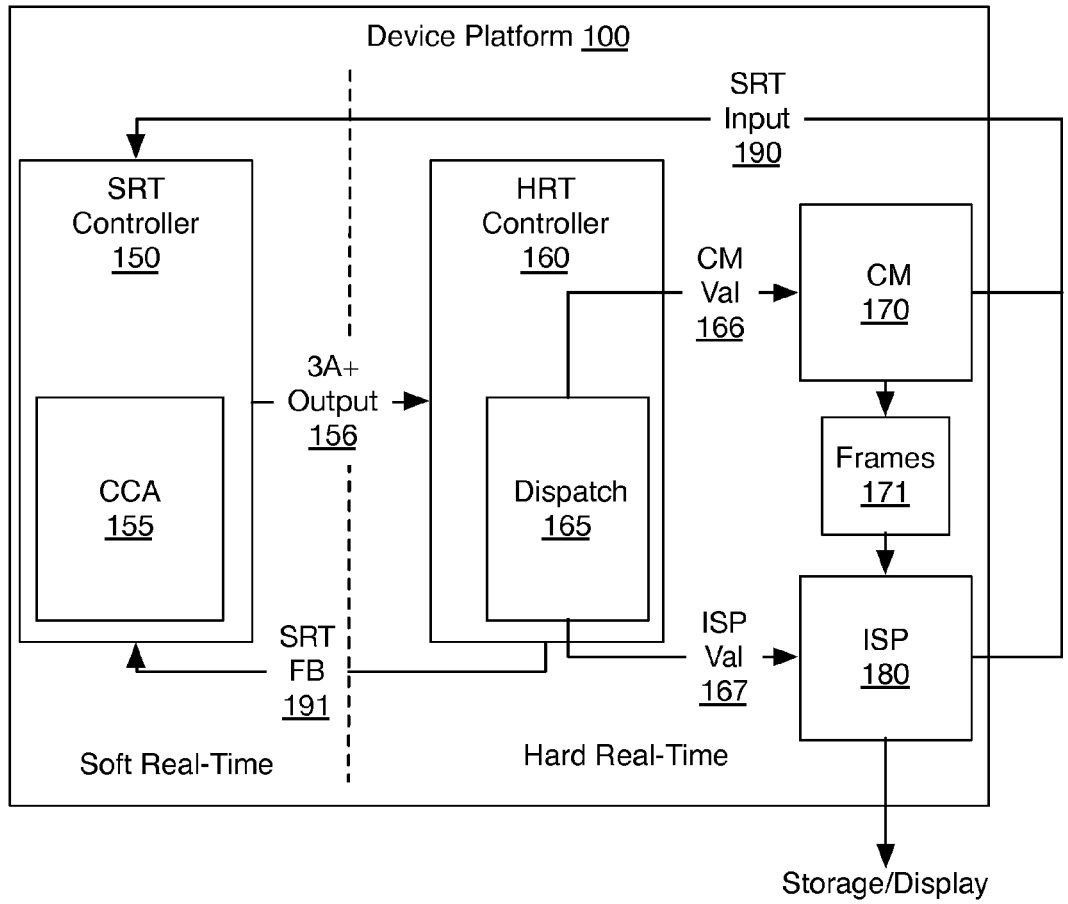
FIG. 1A is a block diagram illustrating a distributed camera controller architecture for accelerated CCA, in accordance with one or more embodiment.

One or more embodiments are described with reference to the enclosed figures. While specific configurations and arrangements are depicted and discussed in detail, it should be understood that this is done for illustrative purposes only. Persons skilled in the relevant art will recognize that other configurations and arrangements are possible without departing from the spirit and scope of the description. It will be apparent to those skilled in the relevant art that techniques and/or arrangements described herein may be employed in a variety of other systems and applications beyond what is described in detail herein.

Reference is made in the following detailed description to the accompanying drawings, which form a part hereof and illustrate exemplary embodiments. Further, it is to be understood that other embodiments may be utilized and structural and/or logical changes may be made without departing from the scope of claimed subject matter. Therefore, the following detailed description is not to be taken in a limiting sense and the scope of claimed subject matter is defined solely by the appended claims and their equivalents.

In the following description, numerous details are set forth, however, it will be apparent to one skilled in the art, that embodiments may be practiced without these specific details. Well-known methods and devices are shown in block diagram form, rather than in detail, to avoid obscuring more significant aspects. References throughout this specification to "an embodiment" or "one embodiment" mean that a particular feature, structure, function, or characteristic described in connection with the embodiment is included in at least one embodiment. Thus, the appearances of the phrase "in an embodiment" or "in one embodiment" in various places throughout this specification are not necessarily referring to the same embodiment. Furthermore, the particular features, structures, functions, or characteristics described in the context of an embodiment may be combined in any suitable manner in one or more embodiments. For example, a first embodiment may be combined with a second embodiment anywhere the particular features, structures, functions, or characteristics associated with the two embodiments are not mutually exclusive.

As used in the description of the exemplary embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items.

As used throughout the description, and in the claims, a list of items joined by the term "at least one of" or "one or more of" can mean any combination of the listed terms. For example, the phrase "at least one of A, B or C" can mean A; B; C; A and B; A and C; B and C; or A, B and C.

The terms "coupled" and "connected," along with their derivatives, may be used herein to describe functional or structural relationships between components. It should be understood that these terms are not intended as synonyms for each other. Rather, in particular embodiments, "connected" may be used to indicate that two or more elements are in direct physical, optical, or electrical contact with each other. "Coupled" may be used to indicated that two or more elements are in either direct or indirect (with other intervening elements between them) physical, optical, or electrical contact with each other, and/or that the two or more elements co-operate or interact with each other (e.g., as in a cause an effect relationship).

Some portions of the detailed descriptions provide herein are presented in terms of algorithms and symbolic representations of operations on data bits within a computer memory. Unless specifically stated otherwise, as apparent from the following discussion, it is appreciated that throughout the description, discussions utilizing terms such as "calculating," "computing," "determining" "estimating" "storing" "collecting" "displaying," "receiving," "consolidating," "generating," "updating," or the like, refer to the action and processes of a computer system, or similar electronic computing device, that manipulates and transforms data represented as physical (electronic) quantities within the computer system's circuitry including registers and memories into other data similarly represented as physical quantities within the computer system memories or registers or other such information storage, transmission or display devices.

While the following description sets forth embodiments that may be manifested in architectures such system-on-a-chip (SoC) architectures for example. Implementation of the techniques and/or arrangements described herein are not restricted to particular architectures and/or computing systems, and may be implemented by any architecture and/or computing system for similar purposes. Various architectures employing, for example, multiple integrated circuit (IC) chips and/or packages, and/or various computing devices and/or consumer electronic (CE) devices such as set-top boxes, smartphones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. Furthermore, some material such as, for example, control structures and full software instruction sequences, may not be shown in detail in order not to obscure the material disclosed herein.

Certain portions of the material disclosed herein are implemented in hardware, for example as logic circuitry in a graphics processor. Certain other portions may be implemented in hardware, firmware, software, or any combination thereof. At least some of the material disclosed herein may also be implemented as instructions stored on a machine-readable medium, which may be read and executed by one or more processors (graphics processors and/or central processors). A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical, or other similarly non-transitory, tangible media.

One or more system, apparatus, method, and computer readable media is described below that distributes camera control responsibilities among hard real-time and soft real-time parts. With this architecture, the operation of digital camera control algorithms can be made less sensitive to timing fluctuations among the various systems within a device platform that includes a digital camera and/or image signal processing pipeline. As described further below, real-time dispatch of control parameter values may be offloaded from a controller responsible for generating control parameter values. This architecture has the further advantages of being more flexible and simplifying integration of different CCA libraries. With relaxed timing requirements, libraries may be developed independently of lower-level hardware responsible for managing the dispatch of control parameter values to the CM and/or ISP.

FIG. 1A is a block diagram illustrating a device platform 100 with distributed camera controller architecture for accelerated CCA, in accordance with one or more embodiment. Device platform 100 employs a camera controller architecture distributed between soft and hard real-time domains. In the exemplary embodiment, soft real-time (SRT) camera controller 150 is operable in the soft real-time domain. Hard real-time (HRT) camera controller 160, coupled to an output of SRT camera controller 150, is operable in the hard real-time domain. Also within the hard real-time domain is a camera hardware module (CM) 170, responsible for collecting (e.g., exposing) image data frames 171, and an image signal processor (ISP) 180, responsible for processing image data frames 171, and generating 3A+ statistics utilized as an input to CCA algorithms. As used herein a "camera controller" controls at least one aspect of the operation of at least one of CM 170 and ISP 180. As used herein, a "real-time" camera controller processes input data associated with camera operation or image processing and outputs data associated with camera operation or image processing control sufficiently rapidly to timely affect the operation of the camera hardware or image processing pipeline. In an exemplary embodiment, a camera controller generates and/or provides one or more 3A control parameter value in reference to exemplary AEC, AF, and AWB embodiments. Camera controller output need not be limited to 3A control however, and so may be consider a "3A+" controller as any camera control parameter amenable to having values generated and dispatched in a manner that softens the affect of a missed deadline as described below for the exemplary embodiments may be processed in accordance with the same principles.

For the SRT and HRT camera controllers 150, 160 "real-time" is a function of the frame rate at which frames 171 are exposed (e.g., 30, 60, 120, 240, 480, etc.). In platform 100, SRT camera controller 150 is referred to as "soft" because the 3A+ output 156 is designed to emphasize logical correctness for a given frame and to have a negligible impact on quality (e.g., of a next exposed frame) in the event 3A+ output 156 is received at the destination late (e.g., received by HRT camera controller 160 after a next parameter update window is closed). Each output parameter from SRT camera controller 150 is associated with a reference frame number. Inputs (e.g., 3A+ statistics) generated for a frame are provided to SRT camera controller 150 with an indication of the associated frame (e.g., for which the statistics were determined). The frame reference number maintains SRT camera controller 150 in sync with the hard real time components so that results for frames that have already passed are not output. Hence, if a 3A+ statistics input indicates that SRT controller 150 is to analyze a frame N, then the CCA generates output for a corresponding subsequent target frame. For example, an AEC algorithm will output results beginning with frame N+1. Results for frame N are not output since frame N has already been exposed. However, the SRT controller 150 may generate a parameter value beginning with frame N for some ISP parameter values that may still be updated for a target frame N in certain ISP modes that are not on-the-fly.

HRT camera controller 160 is referred to as "firm" because the timing of an output (e.g., CM parameter values 166 and/or ISP parameter values 167) is relatively more important as the usefulness of each output from controller 160 is lost if it arrives to the destination outside of a time window in which the parameter update must happen. This time window is a function of the parameter that is to be updated and the particular camera sensor that is employed by CM 170. For example, an exposure time parameter has a parameter update window between the integration of a last row in a frame and integration of the first row in a next frame. A different time window may be applicable to other CM parameters (e.g., AG and AD), and a unique parameter update window may also be applicable to ISP parameter values 167 as a function of the actions of ISP 180.

As further illustrated in FIG. 1A, SRT camera controller 150 includes logic circuitry to execute one or more cameral control algorithm 155 to generate 3A+ output 156. While the logic circuitry may be programmable or fixed, in exemplary embodiments, SRT controller 150 is a programmable logic processor, advantageously a CPU that instantiates an operating system including a user space and a kernel space. HRT camera controller 160 includes logic circuitry to receive 3A+ output and execute one or more dispatch algorithms and output parameter values (e.g., CM value 166, or ISP value 167) to the appropriate destination in synchronization with actions of CM 170 and/or ISP 180. HRT controller 160 logic circuitry may be programmable (e.g., a microcontroller, or scalar processor) or fixed (e.g., a state machine).

One 3A+ output 156 includes one or more camera control parameter value (CM value 166 and/or ISP value 167), or a precursor/indication of such a value. CM value 166 and/or ISP value 167 is advantageously a control parameter value that can be estimated for a plurality of frames. CM value 166 may be for any known control parameter associated with hardware in CM 170, such as, but not limited to, lens motor parameters and flash control parameters. ISP value 167 may be for any known control parameter associated with ISP 180, such as, but not limited to, white balance gains, lens shading correction gains, noise suppression parameters, and sharpening parameters. In the exemplary embodiment, HRT camera controller 160 includes control parameter value dispatch logic that is to buffer control parameters received from SRT camera controller 150. The buffered parameters are queued and dispatched sufficiently in advance of the frame associated with each value to avoid slip between writing of an output parameter value to a CM register and the parameter update window available as dictated by CM actions associated with frame collection (e.g., row exposure/integration, row read out, row reset, for all rows in a frame). A similar queuing may be performed for ISP parameter values. Because HRT camera controller 160 need only have logic to manage dispatch and/or queuing of camera control parameters, it may be implemented efficiently in a manner that is independent of the higher-level camera control algorithm(s) implemented by SRT camera controller 150 responsible for originating the control parameter values.

Figure 1B:
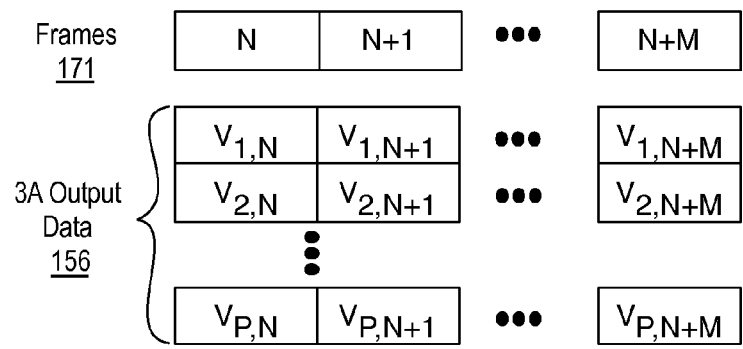
FIG. 1B is a data diagram illustrating a 3A+ output comprising a plurality of parameter values, in accordance with an embodiment.

In advantageous embodiments where HRT controller 160 is enabled to buffer control parameter values, a single 3A+ output 156 includes a set of control parameter values, or a precursor/indication of such a set of values. At least one of the values in the set is a predicted, or estimated, value associated with an advanced frame. Each 3A+ output 156 may include a frame-based series of values for each control parameter. The series is associated with a frame window spanning a predetermined number of consecutive image data frames. In the exemplary embodiment illustrated in FIG. 1B, an atomic 3A+ output 156 includes a control parameter value V for any number of parameters P associated with a reference frame N (e.g., a current frame exposing/processing, or a next frame to be exposed/processed, etc.). An atomic 3A+ output 156 further includes one or more predicted control parameter value (e.g., values $V_{1,N+1}$, $V_{1,N+2}, \ldots V_{1,N+M}$), each of which is associated with a frame that is a predetermined number of frames in advance of the reference frame (e.g., frames N+1, N+2, N+M). The 3A+ output 156 in FIG. 1B therefore has a window spanning N+M consecutive frames for each of P control parameters. While M may vary widely as a function of worst-case slip between the SFT camera controller and the frame rate, for an exemplary embodiment M is between two and ten.

In further embodiments, SRT controller 150 may receive one or more SRT input 190 from either or both of CM 170 and ISP 180. SRT input 190 for example may include embedded data, image statistics, etc. that may be utilized as inputs to a CCA, as described further below.

In further embodiments, one or more feedback 191 may be present between SRT controller 150 and HRT controller 160. Feedback 191 includes any data passed back from HRT controller 160 to SRT controller 150. In one exemplary embodiments, feedback 191 includes an indication of an index position within a buffered queue of camera control parameters. The SRT controller 150 may include logic to initiate a CCA call or at least increase a priority of CCA execution as a function of such feedback 191, for example to avoid an underflow condition at HRT controller 160.

Figure 2:
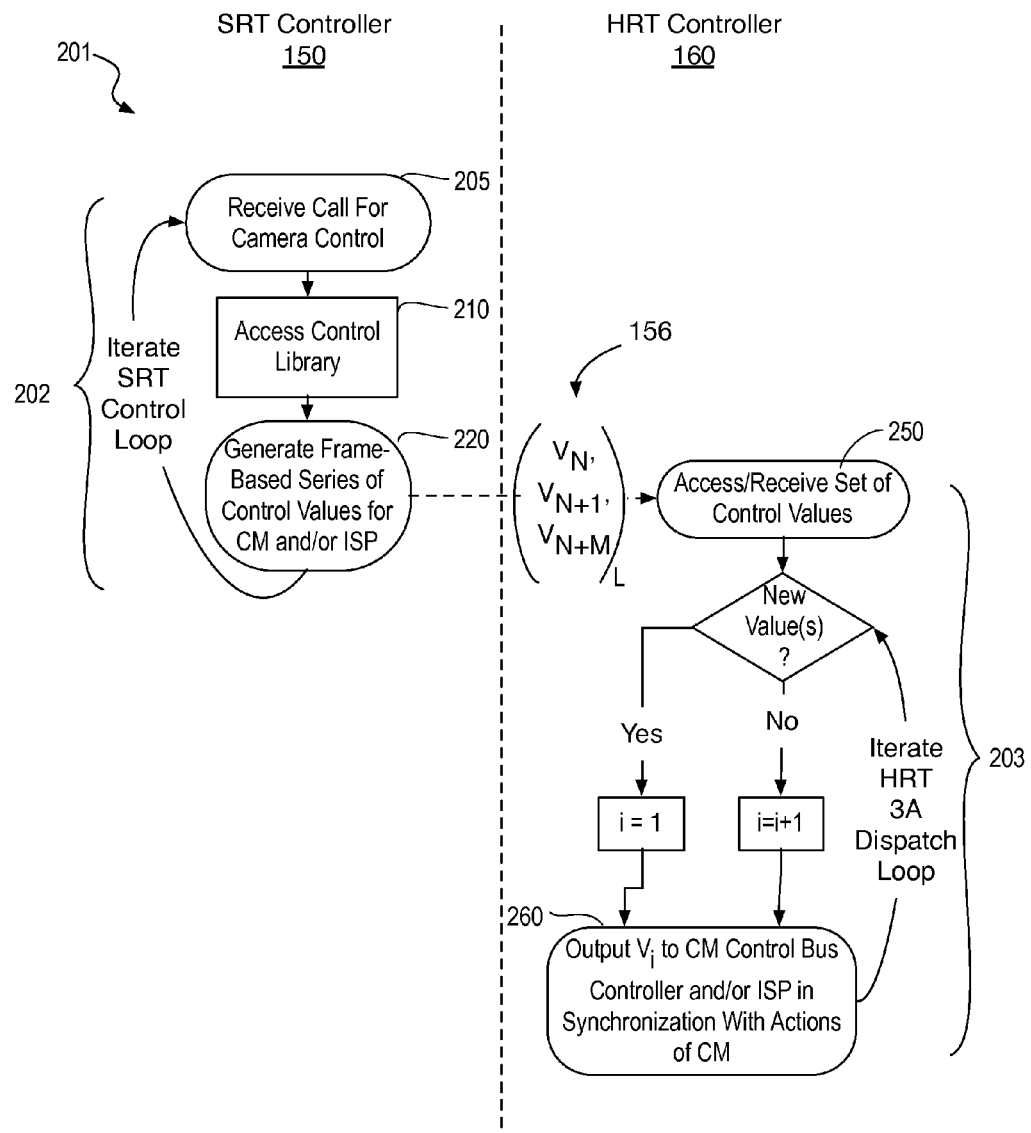
FIG. 2 is a flow diagram illustrating distributed camera control parameter value generation and dispatch, in accordance with one or more embodiment.

FIG. 2 is a flow diagram illustrating accelerated CCA execution process 201, including distributed control parameter value generation and dispatch, in accordance with one or more embodiment. As illustrated in FIG. 2, method 301 is divided into soft real-time operations 202 performed by SRT camera controller 150, and hard real-time operations 203 performed by HRT camera controller 160. Soft real-time operations 202 may be iterated at a first (variable) frequency in response to successive camera control calls and further as a function of the SRT camera controller bandwidth available to execute a CCA. Soft real-time operations 202 may be performed independent of deadlines imposed by a camera frame rate. Hard real-time operations may be iterated at a second frequency in synchronization with the camera frame rate to meet deadlines imposed by the frame rate.

In an embodiment, SRT camera controller 150 executes one or more algorithm to estimate control parameter values that follow a convergence plan determined for example based on inputs, such as camera control statistics made available to SRT camera controller 150 at the time of calculation. Each frame from a camera sensor has its own frame reference number. Typically this number is also included in embedded data output from the sensor before the associated raw image data, but the frame reference number could be assigned also by the input system that receives the data from the sensor. These statistics and associated reference frame inputs may be provided in a camera control call at operation 205. In response to the call received at operation 205, a camera control library is accessed at operation 210. The control library may specify a convergence plan for a given control parameter, which defines how one or more parameter value is to be modulated between an initial value to a final value over a frame sequence between an initial frame to a final frame. For example, with an exposure convergence plan determined at operation 210, a target exposure parameter, or target total exposure, may be determined with an AEC algorithm to provide a smooth change in brightness over a sequence of consecutive frames. Based on input parameters and CCA library information, a frame-based series of control parameter values following the convergence plan are generated at operation 220. All or a portion of the values determined at operation 220 are then sent to the HRT camera controller 160 as 3A+ output 156, completing one SRT control loop iteration. The SRT control loop may then be reiterated to generate successive 3A+ outputs, which are re-calculated based on updated inputs. Because SRT controller 150 typically does not need to change the direction of convergence with every frame, successive iterations may generate overlapping 3A+ outputs with similar values. With the SRT camera controller 150 free from the burden of meeting frame-based deadlines, the most advanced and complex scene analysis and CCA may be utilized. Furthermore, the computation time required to generate control values based on a convergence plan need not scale proportionately with the number of control values generated at each iteration. While generally, 3A code does not parallelize well, it may be possible to parallelize across generation of multiple predicted values spanning a number of frames in advance of a reference frame.

Process 201 continues with HRT controller 160 receiving or accessing the frame-based series of values, as it is intermittently output by SRT controller 150. HRT controller 160 determines if new control parameter values are available. In the event no new parameter values are available at operation 250, a value $V_i$ from a 3A+ output 156 that was previously buffered by the HRT controller 160 is output to the CM (e.g., CM control bus controller) or ISP. In exemplary embodiments where 3A+ output 156 includes multiple values, HRT controller 160 iterates through an HRT dispatch loop to sequentially provide control parameter values associated with consecutive frames in a frame-based series. With each iteration of HRT operations 203, a newest available control parameter value is output. In the example illustrated in FIG. 2, HRT camera controller 160 may maintain an index i incremented for each parameter value within a set of parameter values received as 3A+ output 156. At operation 260, the control parameter value $V_i$ is then output. The HRT dispatch loop iterates in step with the frame rate, incrementing index i with each iteration and outputting control parameter value $V_{i+1}$, etc. to the CM or ISP. In response to having received new control parameter values at operation 220, index i is reset. While FIG. 2 illustrates logic associated with iterating through buffered parameter values or outputting a newly received parameter value, in one exemplary implementation HRT controller 160 includes a circular parameter value buffer having a predetermined number of slots, for example equal to the frame window. Each slot in the parameter buffer may store a frame number (e.g., N) and associated parameter value (e.g., $V_N$) pair. Upon receiving a new parameter output 160, parameter values stored in memory slots associated with matching frame numbers are overwritten, and new (previously non-existent) frame numbers will overwrite old frame numbers that have already been processed.

In accordance with exemplary embodiments, each iteration of HRT operations 203 provides a control parameter value in sufficient time to affect the collection or processing of the target frame. For example, a CM control parameter value is output to a camera control bus in time to be written to a camera control register during a next blanking space configured in the CM. Vertical (frame) blanking and horizontal (line) blanking may be used for system synchronization. A sensor in the CM may be configured to meet some predetermined vertical blanking and horizontal blanking requirements. Horizontal blanking is typically defined in terms of pixel clocks and vertical blanking is defined in terms of row readout times. Horizontal or line blanking may be used to provide a downstream component, such as an ISP, sufficient time to handle incoming data so as to avoid an input buffer overrun. Vertical blanking may be used to control the frame rate where the longer the vertical blanking, the slower the frame rate, the longer the maximum possible exposure time, and the more time to perform the calculations associated with camera control algorithms before read-out of the next frame. With the HRT camera controller 160 free from the burden of performing such calculations (e.g., associated with a convergence plan), and with buffered control parameter values, slip between the blanking space and write out of an updated control parameter value can be avoided even at accelerated frame rates (e.g., 60-480 fps). Process 301 may therefore maintain high video quality even at accelerated rates because SRT controller 150 typically does not need to change the direction of convergence with every frame, and slips between HRT controller 160 and CM 170/ISP 180 can be avoided.

Figure 3:
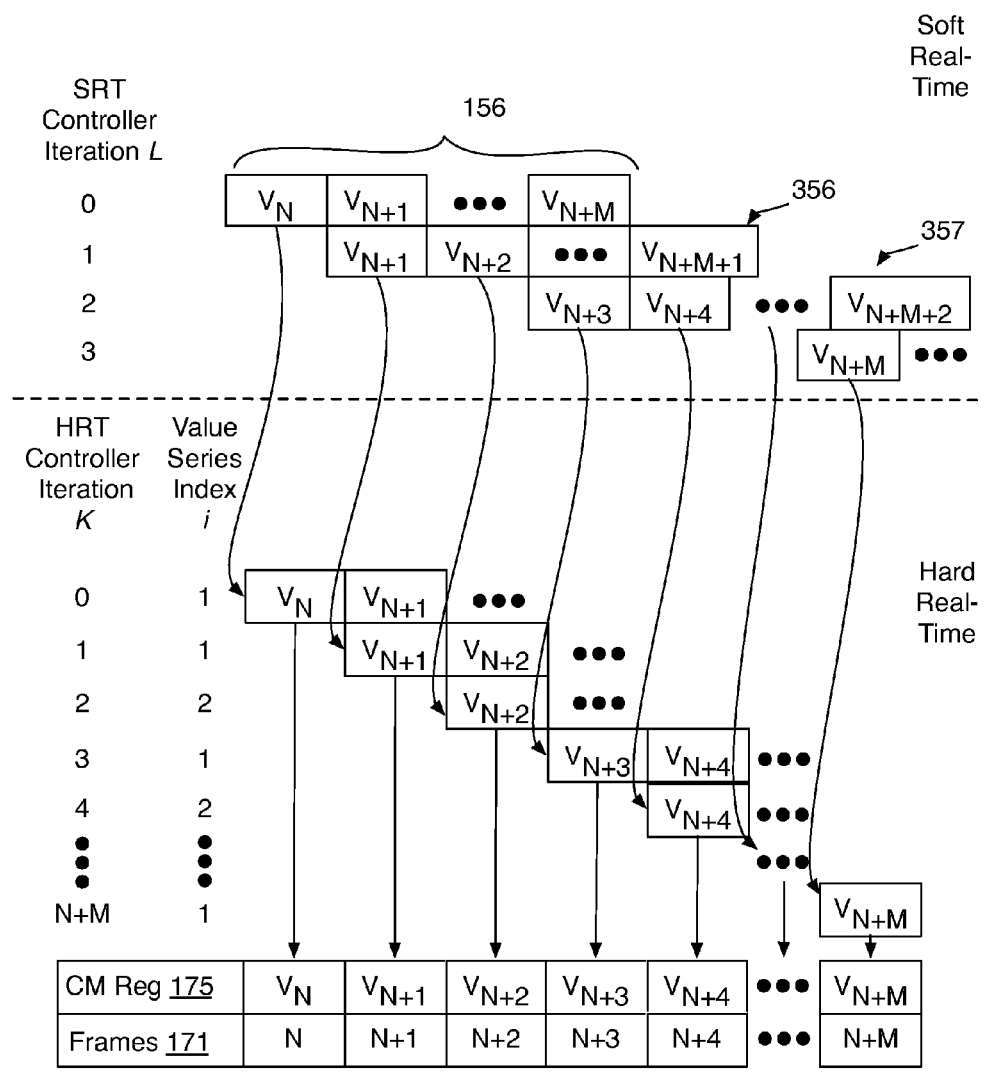
FIG. 3 is a data flow diagram illustrating distributed camera control parameter generation and dispatch to a CM register, in accordance with one or more embodiment.

FIG. 3 is a data flow diagram illustrating generation and dispatch of camera control parameter values to a CM register, in accordance with one or more embodiment. FIG. 3 further illustrates how slips of varying severity between an SRT controller and a CM operating at a given frame rate may be mitigated by buffering actions of an HRT controller synchronized with the CM. Although described in the context of a CM, the description is equally applicable to various ISP parameter values.

As illustrated in FIG. 3, 3A+ output associated with a fixed frame window spanning M frames is generated at each of four SRT controller loop iterations L. The rolling frame window covered by the 3A+ output 156 for a first iteration may overlap with the 3A+ output of a second iteration by a number of frames that may vary as a function of rate at which the SRT controller generates output data and the number of frames estimated in each output from the SRT controller. Where there is no change in direction of convergence between SRT controller iterations, some parameter values in the 3A+ output corresponding to overlapped frames may be substantially equal across the iterations. For each iteration, the 3A+ output begins with a first value (e.g., $V_N$) associated with reference frame (e.g., frame N) and ends with a value associated with the last frame in the frame window (e.g., $V_{N+M}$). For a first HRT dispatch loop iteration K=0, parameter value $V_N$ in a first index position (i=1) of the 3A+ output 156 is received from the SRT controller and written to a CM register 175 within a parameter update time window for frame N. The SRT controller executes another iteration L=1, generating 3A+ output 356, which is again output to HRT controller in time to be received by HRT controller during iteration K=1. The parameter values beginning with $V_{N+1}$ in the 3A+ output 356 overwrite those from 3A+ output 156 and $V_{N+1}$ is written to CM register 175 within a parameter update time window for frame N+1. Because the update from the SRT camera controller was timely with respect to the CM parameter update window for frame N+1, the parameter values $V_{N+1}$ through $V_{N+M}$ in output data 156 are never written to CM register 175. The parameter values $V_{N+1}$ through $V_{N+M+1}$ in output data 356 are retained, for example in slots of a circular buffer. The SRT controller executes another iteration (L=2), generating 3A+ output 357, which is output to the HRT controller, but because of one or more timing issue does not arrive by the deadline to be utilized in the next HRT controller iteration (K=2). Therefore, the parameter value $V_{N+2}$ in the next index position (i=2) of 3A+ output 356 is written to CM register 175 within a parameter update time window for frame N+2. Because the update from the SRT camera controller was not timely with respect to the CM parameter update window for frame N+1, the parameter value $V_{N+1}$ in 3A+ output 356 is relied upon to further a previously determined convergence plan. When the HRT controller executes the next iteration (K=3), the parameter value $V_{N+3}$ in the first index position (i=1) of 3A+ output 357 is written to CM register 175 during the CM parameter update window for frame N+3. The parameter values $V_{N+3}$ through $V_{N+M+1}$ in output data 356 are therefore never written to CM register 175. The parameter values $V_{N+3}$ through $V_{N+M+2}$ in output data 357 are retained, for example in slots of the circular buffer. When the HRT controller executes the next iteration (K=4), the parameter value $V_{N+4}$ in the second index position (i=2) of 3A+ output 357 is written to CM register 175 during the CM parameter update window for frame N+3. The values in the 3A+ output 357 continue to be popped out iteratively (e.g., in a frame-based FIFO series) synchronous with each successive frame until an updated output data set is received from the SRT controller. The 3A+ output may therefore span a window of frames selected to accommodate a worst-case slip between the SRT controller and CM. The 3A+ output should be generated at a frequency more than the ratio of the frame rate to the number of frames spanned by the 3A+ output with some margin to accommodate the possibility of a timing slip occurring after some number of buffered parameter values have already been consumed. For example:

$$3+ \text{Output Rate} = \text{Margin} * \frac{\text{frame rate}}{\text{Number of Frames in 3}A+ \text{Output Frame Window}}. \tag{1}$$

where Margin may be, for example, between 1 and the number of frames in the 3A+ output frame window.

During nominal operating conditions, the SRT controller should generate a 3A+ output at minimum frequency that is at least equal to the ratio of the frame rate to the number of frames in each output data set, and only the first value of the frame-based series of values in the SRT controller 3A+ output would be dispatched to a CM register or to the ISP. In the event a CCA executing on the SRT controller requires more time to execute, for example because of extensive scene analysis, or the controller is temporarily loaded with other tasks (that may be unrelated to camera control), then the HRT controller dispatches buffered parameter values including other than the first value in a 3A+ output. With the condition that the number of buffered values is sufficient for a given frame rate, the HRT controller will not iterate through all buffered parameter values (M iterations), avoiding an underflow condition inducing slip between HRT controller and the CM. In some embodiments therefore, the number of frames M contained in SRT camera controller output is a function of the frame rate (e.g., M increasing with higher frame rates).

Notably, with camera control architecture and processing distributed between SRT and HRT camera controllers as illustrated in FIG. 1-FIG. 3, camera control algorithms implemented by the SRT controller, any software implemented by the SRT controller requires less embedded programming because the CM and ISP interfacing is further abstracted by the HRT camera controller. A relatively static HRT controller design may be implemented in a given platform that will remain suitable for multiple generations of 3A+ software libraries. Even third party libraries may be readily integrated since timing and requirements are relaxed at the SRT controller level. Furthermore, timely sensor register writes and ISP parameter updates can be ensured even at high frame rates to avoid slowed convergence of a control parameter and/or visible artifacts, such as brightness flickers in a live preview screen or in a recorded video from frame to frame.

Figure 4:
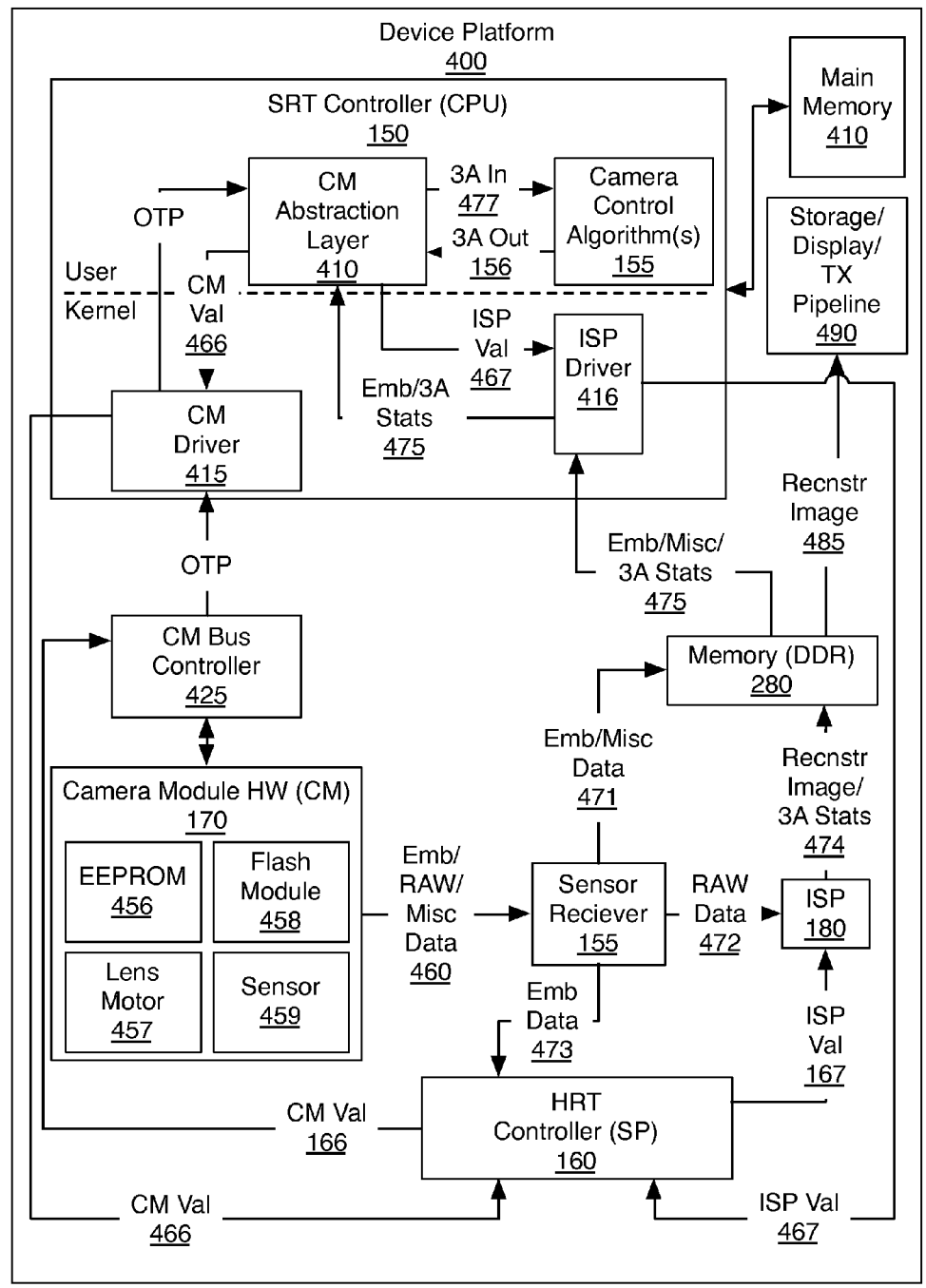
FIG. 4 is system diagram of a device platform with a distributed camera controller architecture for accelerated CCA, in accordance with one or more embodiment.

FIG. 4 is system diagram of a device platform 400 that employs a distributed camera controller architecture for accelerated CCA, in accordance with one or more embodiment. FIG. 4 further illustrates how the SRT and HRT camera controller architecture introduced in FIG. 1-FIG. 3 may be integrated with various other components of a device platform to implement an accelerate camera control architecture suitable for high frame rates. FIG. 4 also illustrates how an HRT camera controller may further utilize embedded data output from a CM.

Platform 400 includes CM 170. In the exemplary embodiment, CM 170 further includes EEPROM 456, lens motor 457, flash module 458, and camera sensor 459. Sensor 459 may be a QXGA, WQXGA, or QSXGA-format digital image device, for example. Camera sensor 459 may provide a color resolution of 10 bits, or more per pixel, is operable to capture continuous video frames progressively. Sensor 459 may have a pixel frequency of 170 MHz, or more. Camera sensor 459 may include an RGB Bayer color filter, an analog amplifier, an A/D converter, other components to convert incident light into a digital signal corresponding to raw image data. Sensor 459 may be controlled to operate a rolling shutter or electronic focal plane shutter process where pixels are read out progressively in a line-sequential fashion for a frame. CM 170 may have a number of control registers (e.g., 16-bit) addressable for example, through a camera control bus with an 8-bit address. Control registers of CM 170 may be programmed for example through an I²C serial interface managed by camera control bus controller 425 (e.g., an I²C controller).

CM 170 outputs embedded and raw image data 460. In the exemplary embodiment, the embedded data is compliant with the Mobile Industry Processor Interface (MIPI) standard. This embedded data may have a description of the CM control parameters (e.g., exposure parameters such as exposure time, analog gain, digital gain, etc.) that are in effect during collection of the raw image data with which the embedded data is associated. Embedded and raw image data 460 is passed to a sensor receiver 155 that supports the streaming protocol employed by CM 170, such as a MIPI or other input protocol. Sensor receiver 155 is further to output raw image data 472 to one or more ISP 180 and pass embedded data 473 to HRT camera controller 160. Embedded data 471, which may include a frame reference number, is also output to memory 280 so that it may be accessible to SRT controller 150 as a CCA input.

ISP 180 may receive and analyze the raw image data 472 during the horizontal and/or vertical blanking periods associated with CM 170. During raw image data processing, ISP 180 may perform one or more of noise reduction, pixel linearization, and shading compensation, for example. ISP 180 may perform resolution reduction, Bayer demosaic, and/or vignette elimination. ISP 180 may also calculate image statistics information. Image statistics may include luminance/chrominance values and averages, luminance/chrominance high frequency and texture content, motion content from frame to frame, any other color content values, picture statistical data regarding deblocking control (for example, information controlling deblocking/non-deblocking), RGBS grid, filter response grid, and RGB histograms, etc. ISP 180 is compatible with video codecs, such as H.264/Advanced Video Coding (AVC) or High Efficiency Video Coding (HEVC), JPEG. etc., which may be utilized to post-process YUV data and generate reconstructed image data. Reconstructed image data and calculated 3A statistics 474 are stored in memory 280 (e.g., a double data rate (DDR), or other suitable memory). Reconstructed image data 485 may then be read out to one or more of a storage, display pipeline or transmission pipeline 490, to store display, or transmit some representation of exposed frames.

Data, such as the 3A statistics and embedded data 475, may accessed from memory 280 by SRT controller 150 for further analysis, for example during a 3A control loop iteration. In the exemplary embodiment, SRT controller 150 is implemented by a central processing unit (CPU) that instantiates an operating system including a user space and a kernel space. SRT controller 150 may be implemented by any known processor, and may have many functions within a device platform beyond camera control. The CPU may be a large vector processor with access to a main memory 410 of the device platform. Main memory 410 may store one or more 3A library. SRT controller 150 is to execute camera control algorithm(s) 155 substantially as described above, based on for example 3A input 477 received through CM abstraction layer 410. CM abstraction layer 410 may be any hardware abstraction layer configured for the particular operating system instantiated. CM abstraction layer 410 may for example handle compatibility between third-party 3A control algorithms and CM 170, and/or HRT controller 160, and/or ISP 180. In one exemplary embodiment, CM abstraction layer 410 maps a request for statistics for a frame N–J and returns 3A statistics 475 to CCA 155 as 3A input 477.

Execution of CCA 155 may further entail accessing at least one of an automatic exposure or auto automatic white balance library stored in main memory 410 to generate CM control parameter values. In one exemplary AEC embodiment, execution of CCA 155 entails performing an exposure calculation that generates target total exposures and corresponding frame numbers as part of an exposure convergence plan for frame N through frame N+M after the analysis of frame N–J statistics, but before the analysis of a next frame N–J+1. The target total exposures are included in 3A output 156 passed to CM abstraction layer 410. CM abstraction layer 410 passes values in 3A output 156 associated with CM 170 (e.g., target total exposures for frames N–N+M) as CM control parameter values 466 to CM driver 415. In a further embodiment, execution of CCA 155 entails performing a white balance gain calculation that generates target gain values and corresponding frame numbers as part of a white balance convergence plan for frame N through frame N+M after the analysis of frame N–J statistics, but before the analysis of a next frame N–J+1. The gain values are included in 3A output 156 passed to CM abstraction layer 410. CM abstraction layer 410 passes values in 3A output 156 associated with ISP 180 (e.g., gain values for frames N through N+M) as ISP control parameter values 467 to ISP driver 416.

CM driver 415 passes CM control parameter values 466 to HRT controller 160. ISP driver 416 likewise passes ISP control parameter values 467 to HRT controller 160. In an exemplary embodiment, HRT controller 160 is implemented by a scalar processor and is to receive CM values 466, ISP values 467, as well as embedded data 473 passed from sensor 473. HRT controller 160 is to queue CM values 466 frames N through N+M, and sequentially dispatch a CM parameter value 166 to CM bus controller 425. CM bus controller 425 writes CM value 166 to a CM register in synchronization with actions of CM 170 associated with exposing a next frame (e.g., frame N), and consecutive frames thereafter (e.g., frames N+1 through N+M), etc. HRT controller 160 is further to queue ISP values 467 frames N through N+M, and sequentially dispatch an ISP parameter value 167 to ISP 180.

In an exemplary embodiment where HRT controller 160 is enabled to process embedded data 473, HRT controller 160 is further to modify or supplement at least one ISP parameter value based on embedded data 473. Generally, HRT controller 160 may perform any embedded data analysis. As embedded data analysis typically does not require extensive logic or access to libraries requiring significant memory resources, and may for example be implemented on a scalar processor (SP) with relatively few lines of code. A secondary control point local to HRT controller 160 and ISP 180 may work in concert with the HRT control parameter value dispatch loop described above. For example, HRT controller 160 may operate on embedded data 473 to robustly time ISP-side digital gain updates. This may be particularly useful where camera sensor 459 lacks sufficiently small digital gain stepping, and/or in the event camera sensor 459 induces fluctuations in consumption of exposure parameter values timely provided as CM values 166. As one example, analysis of embedded data 473 may entail comparing the effective total exposure of a frame to an exposure plan and compensating for any difference by modifying an ISP parameter value, such as a WB gain, before that frame begins processing. In a further example, where the HRT controller 160 has queued a WB gain for dispatch as an ISP value 167, that value may be modified based on the embedded data analysis. Hence, HRT controller 160 may integrate a local HRT control loop based on embedded data analysis with the SRT control loop based on 3A control algorithms.

Figure 5:
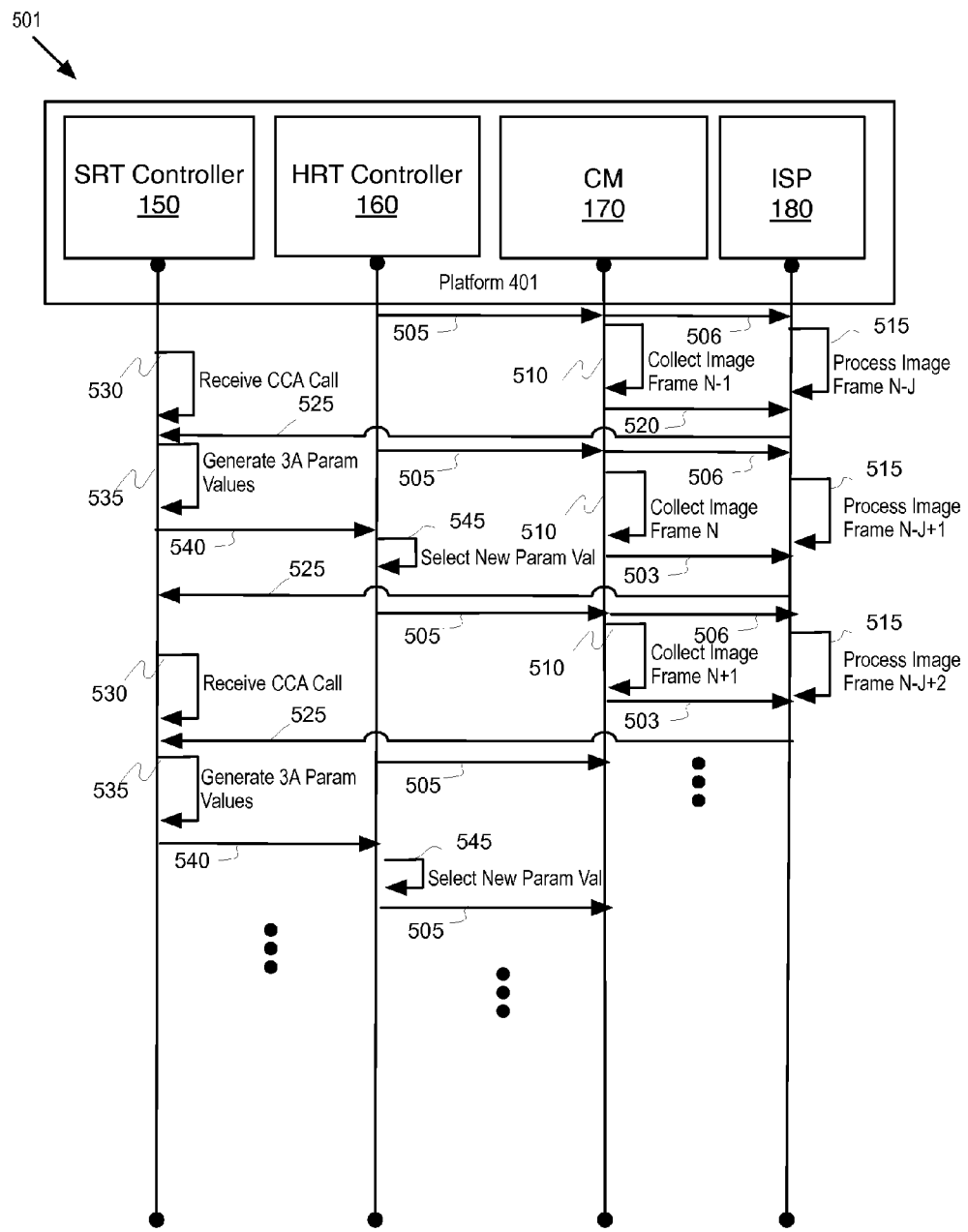
FIG. 5 is a flow diagram illustrating distributed camera control parameter generation and dispatch, in accordance with one or more embodiment.

FIG. 5 is a flow diagram illustrating a distributed camera control parameter generation and dispatch process 501, which is performed by platform 401 in accordance with one or more embodiment. CM 170 exposes an image frame at each operation 510 to generate a sequence of image frames at some frame rate based on CM control parameter values received at operation 505. CM 170 outputs a raw image data frame at operation 520, and ISP 180 processes an image data frame at operation 515 based on ISP parameter values received at operation 506. Although not illustrated in FIG. 5, a representation of the exposed and processed image data frames may then be stored, displayed or transmitted by the device hosting platform 401.

At operation 530 a call for a digital camera control algorithm (e.g., an AEC algorithm) is received and at least one of an automatic focus, automatic exposure, or auto automatic white balance library is accessed in response to the call. At operation 535, a set of CM control parameter values, and/or a set of ISP parameter values are generated as a result of executing the CCA. In exemplary embodiments, each set includes a frame-based series of values determined based on the library and 3A statistics and/or metadata received as input data at operations 525 for a particular frame. The frame-based series is associated with a window spanning a predetermined number of consecutive image data frames (e.g., frame N through M) to be exposed, or have been exposed, by CM 170 at a frame rate. In one embodiment, a set of exposure values converging from a first exposure to a second exposure over the predetermined number of consecutive image data frames is generated at each operation 535 based on an exposure convergence plan.

As further illustrated in FIG. 5, 3A parameter values are generated each time operation 535 is iterated in response to each call received at operation 530. In FIG. 5, between successive operations 535, a frame collection operation 515 is performed twice. In a rolling shutter example, a row integration, row read out, and row reset is performed for every row in a frame two times in succession. As such, sets of 3A parameter values are being generated, at least temporarily, by SRT controller 150 at a frequency less than a frame rate of CM 170 (e.g., approximately ½ the frame rate). At least two frames worth of 3A parameter data is passed to HRT controller 160 at each operation 540 to keep HRT controller 160 from underflow and avoid slip with CM 170. Advantageously, the sets of CM control parameter values, or ISP parameter values, are generated by SRT controller 150 more frequently than at least the ratio of the frame rate to the number of frames in each of the sets.

As further illustrated in FIG. 5, at operation 540, HRT controller 160 accesses or receives the set of CM control parameter values or ISP parameter values intermittently generated at operations 535. At operation 545, HRT controller 160 selects between a control parameter value corresponding to a frame in a first series associated with a first set of parameter values received from SRT controller 150, and a parameter value corresponding to the frame in a second series associated with a second set of parameter values received from SRT controller 150, depending on whether the first or second series values was received more recently. Because of the timing between SRT controller 150 and CM 170 and/or ISP 180, HRT controller 160 sequentially provides two consecutive values in the frame-based series to CM 170 (e.g., to camera bus controller 425 in FIG. 4) or ISP 180 at operations 505 and 506. Each operation 505 and 506 is in synchronization with actions of CM 170 associated with exposing a corresponding pair of consecutive frames at the frame rate. HRT controller 160 sequentially provides first and second values from two different frame-based series of 3A parameter values (i.e., resulting from two different operations 535) by successively performing operation 505 twice, one before, and once after the selection operation 545. At each operation 505, 506 performed between successive operations 535, HRT controller 160 indexes through the most recently received set of 3A parameter values on a frame-by-frame basis beginning with a lowest frame number, popping values to the CM 170 via a camera control bus, or to ISP 180, until another set of control parameter values is received.

Figure 6:
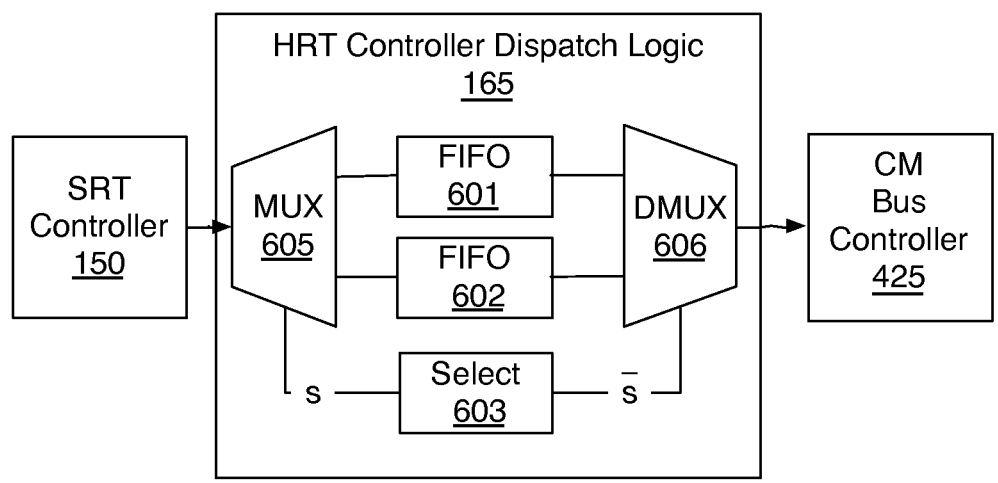
FIG. 6 is block diagram illustrating control parameter dispatch logic, in accordance with one or more embodiment.

FIG. 6 is functional block diagram further illustrating control parameter dispatch logic 165, in accordance with one or more exemplary embodiment. The functions represented in FIG. 6 may be implemented in hardware, software, or a combination of the two with many alternatives, such as any circular buffer architecture known to one of ordinary skill. Control parameter dispatch logic 165 implements a double buffer with a first and second FIFO buffers 601, 602. An input of multiplexer (MUX) 605 is coupled to an output of SRT controller 150. MUX 605 further has outputs coupled to an input to each FIFO buffer 601, 602. Outputs of FIFO buffer 601, 602 are coupled to inputs of demultiplexer (DMUX) 606. DMUX 606 has an output coupled to CM bus controller 425. A set of control parameter values received at MUX 605 is read in FIFO buffer 601, or 602, depending on a select signal s determined by select logic 603. A complementary select signals s̄ switches read out to FIFO buffer 601, 602 not selected for read in. Between read in events, control parameter values are popped from the selected FIFO buffer in synchronization with actions of a CM, as described elsewhere herein. At a read-in the selected buffer 601, 602 is flushed and refilled. Similar logic may be implemented for incrementally dispatching ISP control parameters.

Figure 7:
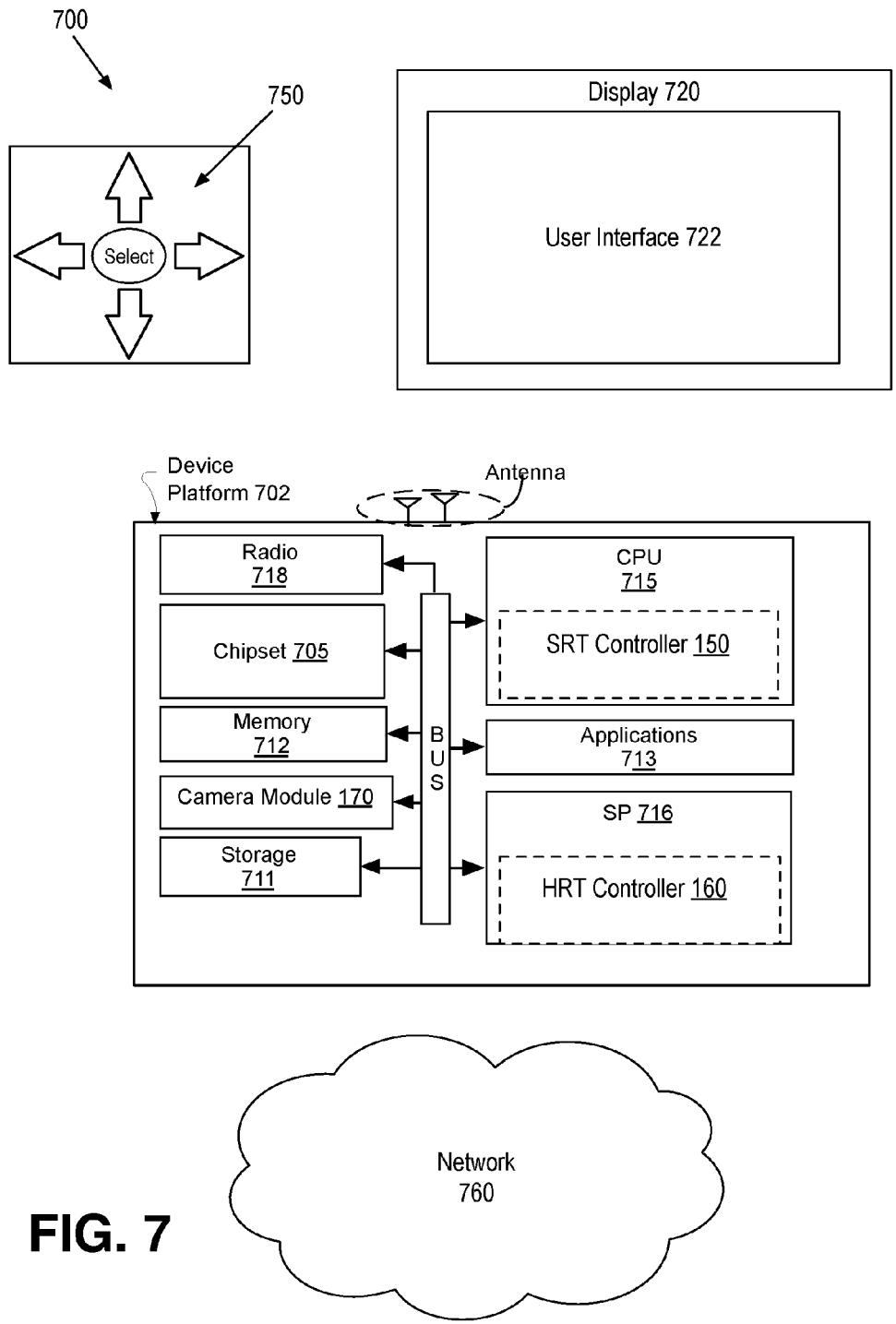
FIG. 7 is a diagram of an exemplary system employing a distributed camera controller architecture in accordance with one or more embodiment.

FIG. 7 is an illustrative diagram of an exemplary system 700, in accordance with embodiments. System 700 may be a mobile device although system 700 is not limited to this context. For example, system 700 may be incorporated into a laptop computer, ultra-laptop computer, tablet, touch pad, portable computer, handheld computer, palmtop computer, cellular telephone, smart device (e.g., smart phone, smart tablet or mobile television), mobile internet device (MID), messaging device, data communication device, and so forth. System 700 may also be an infrastructure device. For example, system 700 may be incorporated into a large format television, set-top box, desktop computer, or other home or commercial network device.

System 700 includes a device platform 702 that may implement all or a subset of the various camera control methods and any of the camera control platforms described above in the context of FIG. 1-FIG. 6. In various exemplary embodiments, CPU 715 executes camera control algorithms. CPU 715 includes logic circuitry implementing SRT controller 150 to intermittently generate sets of camera control parameter values asynchronously with CM 170, for example as described elsewhere herein. In one embodiment, a CPU 715 implements an SRT controller 150 that executes an AEC algorithm and generates a frame-based series of exposure targets for controlling camera module 170. In some embodiments, one or more computer readable media may store instructions, which when executed by CPU 715, cause the processor to execute one or more of the 3A+ control algorithms described elsewhere herein. In further embodiments, platform 702 includes a scalar processor 716 that includes logic circuitry implementing HRT controller 160 to dispatch control parameter values synchronously with CM 170, as described elsewhere herein. One or more image data frame exposed by CM 170 using control parameter values determined by CPU 715 and dispatched by scalar processor 716 may then be stored in memory 712.

In embodiments, device platform 702 is coupled to a human interface device (HID) 720. Platform 702 may collect raw image data with CM 170, which is processed and output to HID 720. A navigation controller 750 including one or more navigation features may be used to interact with, for example, device platform 702 and/or HID 720. In embodiments, HID 720 may include any television type monitor or display coupled to platform 702 via radio 718 and/or network 760. HID 720 may include, for example, a computer display screen, touch screen display, video monitor, television-like device, and/or a television.

Under the control of one or more software applications 716, device platform 702 may display user interface 722 on HID 720. Movements of the navigation features of controller 750 may be replicated on a display (e.g., HID 720) by movements of a pointer, cursor, focus ring, or other visual indicators displayed on the display. For example, under the control of software applications 716, the navigation features located on navigation controller 750 may be mapped to virtual navigation features displayed on user interface 722.

In embodiments, device platform 702 may include any combination of CM 170, chipset 705, processors 715, 716, memory 712, storage 711, applications 713, and/or radio 718. Chipset 705 may provide intercommunication among processors 715, 716, memory 712, storage 711, graphics processor 715, applications 713, or radio 718.

One or more of processors 715, 716 may be implemented as one or more Complex Instruction Set Computer (CISC) or Reduced Instruction Set Computer (RISC) processors; x86 instruction set compatible processors, multi-core, or any other microprocessor or central processing unit (CPU).

Memory 712 may be implemented as a volatile memory device such as, but not limited to, a Random Access Memory (RAM), Dynamic Random Access Memory (DRAM), or Static RAM (SRAM).

Storage 711 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device.

Radio 718 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 618 may operate in accordance with one or more applicable standards in any version.

In embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

The distributed camera controller architecture for accelerated CCA and related accelerated CCA processes as described herein may be implemented in various hardware architectures, cell designs, or "IP cores."

Figure 8:
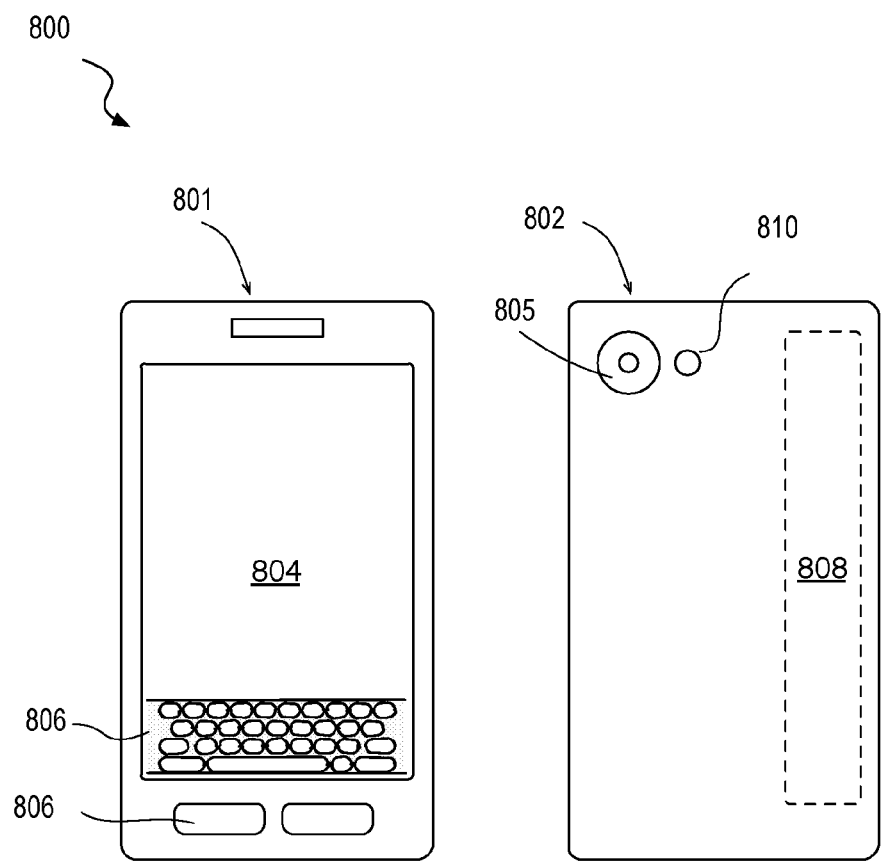
FIG. 8 is a diagram of an exemplary mobile handset platform, arranged in accordance with one or more embodiment.

As described above, system 700 may be embodied in varying physical styles or form factors. FIG. 8 illustrates embodiments of a mobile handset device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smartphone, tablet or smart television), mobile internet device (MID), messaging device, data communication device, and so forth. Examples of a mobile computing device also may include computers and/or media capture/transmission devices configured to be worn by a person, such as a wrist computer, finger computer, ring computer, eyeglass computer, belt-clip computer, armband computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 8, mobile handset device 800 may include a housing with a front 801 and back 802. Device 800 includes a display 804, an input/output (I/O) device 806, and an integrated antenna 808. Device 800 also may include navigation features 712. Display 804 may include any suitable display unit for displaying information appropriate for a mobile computing device. I/O device 806 may include any suitable I/O device for entering information into a mobile computing device. Examples for I/O device 806 may include an alphanumeric keyboard, a numeric keypad, a touch pad, input keys, buttons, switches, microphones, speakers, voice recognition device and software, and so forth. Information also may be entered into device 800 by way of microphone (not shown), or may be digitized by a voice recognition device. Embodiments are not limited in this context. Integrated into at least the back 802 is camera 805 (e.g., including a lens, an aperture, and an imaging sensor), and a flash 810, both of which may be components of a CM, as described elsewhere herein.

Embodiments described herein may be implemented using hardware elements, software elements, or a combination of both. Examples of hardware elements or modules include: processors, microprocessors, circuitry, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software elements or modules include: applications, computer programs, application programs, system programs, machine programs, operating system software, middleware, firmware, routines, subroutines, functions, methods, procedures, software interfaces, application programming interfaces (API), instruction sets, computing code, computer code, code segments, computer code segments, data words, values, symbols, or any combination thereof. Determining whether an embodiment is implemented using hardware elements and/or software elements may vary in accordance with any number of factors considered for the choice of design, such as, but not limited to: desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable storage medium. Such instructions may reside, completely or at least partially, within a main memory and/or within a processor during execution thereof by the machine, the main memory and the processor portions storing the instructions then also constituting a machine-readable storage media. Programmable logic circuitry may have registers, state machines, etc. configured by the processor implementing the computer readable media. Such logic circuitry, as programmed, may then be understood to have been physically transformed into a system falling within the scope of the embodiments described herein. Instructions representing various logic within the processor, which when read by a machine may also cause the machine to fabricate logic adhering to the architectures described herein and/or to perform the techniques described herein. Such representations, known as cell designs, or IP cores, may be stored on a tangible, machine-readable medium and supplied to various customers or manufacturing facilities to load into the fabrication machines that actually make the logic or processor.

While certain features set forth herein have been described with reference to embodiments, this description is not intended to be construed in a limiting sense. Hence, various modifications of the implementations described herein, as well as other implementations, which are apparent to persons skilled in the art to which the present disclosure pertains are deemed to be within the spirit and scope of the present disclosure.

The following paragraphs briefly describe some exemplary embodiments.

In one or more first embodiment, a platform for image processing with digital camera control algorithms includes a camera control bus to couple with one or more camera hardware module (CM). The platform further includes a soft real-time (SRT) camera controller including logic circuitry to generate camera control parameter values by executing one or more camera control algorithm. The platform further includes a hard real-time (HRT) camera controller coupled between the SRT controller and the camera control bus, the HRT controller including logic circuitry to receive the control parameter values intermittently from the SRT controller, and output the control parameter values to the control bus in synchronization with actions of a CM associated with exposing consecutive image data frames.

In furtherance of the first embodiment, the SRT controller is to iteratively generate a frame-based series of CM control parameter values, the frame-based series associated with a window spanning a predetermined number of consecutive image data frames to be exposed by a CM at a frame rate. The HRT controller is to sequentially provide at least two consecutive control parameter values in the frame-based series to the control bus in synchronization with actions of a CM associated with exposing a corresponding pair of consecutive frames at the frame rate, or is to sequentially provide a first value in the frame-based series, and a second value in a second frame-based series, in synchronization with actions of the CM associated with exposing the corresponding pair of consecutive frames at the frame rate.

In furtherance of the embodiment immediately above, the HRT controller is to provide to the control bus a newest control parameter value associated with a frame in the window by selecting between the control parameter value corresponding to the frame in a first series, and a control parameter value corresponding to the frame in a second series, depending on whether the first or second series of CM control parameter values was received more recently.

In furtherance of the first embodiment, the HRT controller includes logic circuitry to receive from the SRT controller one or more sets of CM control parameter values, each set including a frame-based series of CM control parameter values associated with a window spanning predetermined number of consecutive image data frames to be exposed. The HRT controller includes logic circuitry to pop control parameter values to the control bus from a first set of control parameter values by indexing through the values in the set on a frame-by-frame basis until a second set of control parameter values is received from the SRT controller. HRT controller includes logic circuitry to pop control parameter values from the second set of control parameter values by indexing through the values in the set on a frame-by-frame basis beginning with the parameter value associated with a lowest frame number in the second set, until another set of control parameter values is received.

In furtherance of the first embodiment, the SRT controller is to iteratively generate sets of sensor exposure values, each set including a frame-based series of sensor exposure values. Each frame-based series is associated with an exposure value convergence plan and spans a predetermined number of consecutive image data frames to be exposed by a CM at a frame rate. Exposure value sets are generated asynchronously with the frame rate The HRT controller is to receive the sets of exposure values from the SRT controller more frequently than the ratio of the frame rate to the number of frames in each set. The HRT controller is to pop exposure values sequentially to the control bus, at the frame rate, from a first set of values by indexing through the values on a frame-by-frame basis until an updated set of exposure values is received. The HRT controller is to pop exposure values sequentially to the control bus, at the frame rate, from the updated set of exposure values by indexing through the values on a frame-by-frame basis beginning with the exposure value associated with a lowest frame number in the updated set, until the set of control parameter values is updated again.

In furtherance of the first embodiment, the platform further includes an image signal processor (ISP) coupled to the HRT controller. The SRT controller further includes logic circuitry to iteratively generate ISP parameter values. The HRT controller is further coupled between the SRT controller and the ISP and further includes logic circuitry to receive the ISP parameter values intermittently from the SRT controller. The HRT controller is to incrementally output ISP parameter values to the ISP in synchronization with actions of the ISP associated with processing consecutive image data frames.

In furtherance of the embodiment immediately above, the SRT controller is to generate a frame-based series of ISP parameter values, or an indication thereof, wherein the frame-based series is associated with a window spanning a predetermined number of consecutive image data frames to be processed by the ISP. The HRT controller is to sequentially provide at least two consecutive control parameter values in the frame-based series, or derived from the indication thereof, to the ISP in synchronization with actions of the ISP associated with processing a corresponding pair of consecutive frames.

In furtherance of the embodiment above, the platform further includes an image data receiver coupled between output of one or more CM and the HRT controller. The image data receiver includes logic circuitry to receive both raw image data for a frame and embedded data indicative of CM control parameters in effect during a collection of the raw image data. The image data receiver includes logic circuitry to output the raw image data to the ISP and the embedded data to the HRT controller. The HRT controller is further to modify or supplement at least one ISP parameter value based on the embedded data.

In furtherance of the first embodiment, the platform further includes the CM to expose image data frames at a frame rate. The platform further includes a memory coupled to the SRT controller to store at least one of an automatic exposure or auto automatic white balance library accessed by the SRT controller to generate the CM control parameter values. The platform further includes an image signal processor (ISP) coupled to an output of the CM to process the image data frames. The platform further includes at least one of a display device or storage device coupled downstream of the ISP to display or store a representation of the collected image data frames.

In one or more second embodiment, a computer-implemented method of image processing with digital camera control algorithms includes receiving a call for a camera control algorithm. The method includes accessing at least one of an automatic focus, automatic exposure, or auto automatic white balance library in response to the call. The method includes generating a set of camera hardware module (CM) control parameter values, or a set of image signal processing (ISP) parameter values, each set including a frame-based series of values determined based on the library, wherein the frame-based series is associated with a window spanning a predetermined number of consecutive image data frames to be exposed, or have been exposed, by a CM at a frame rate.

In furtherance of the second embodiment, the generating is iterated in response to each call received and the resulting sets of CM control parameter values, or ISP parameter values, are generated more frequently than the ratio of the frame rate to the number of frames in each of the sets.

In furtherance of the second embodiment, receiving the call for a digital camera control algorithm further comprises receiving a call for an automatic exposure control algorithm. Generating the set of camera hardware module (CM) control parameter values further includes determining an exposure convergence plan, including at least one of target exposure parameters or target total exposures, to provide a smooth change in brightness along a sequence of frames, and generating a set of exposure values converging from a first exposure to a second exposure over the predetermined number of consecutive image data frames based on the exposure convergence plan.

In furtherance of the second embodiment, the method includes accessing or receiving the set of camera hardware module (CM) control parameter values or ISP parameter values, and outputting the control parameter values to a camera control bus or the ISP parameter values to an ISP in synchronization with actions of a CM associated with exposing consecutive image data frames.

In furtherance of the embodiment immediately above, the method includes generating the set of CM control parameter values, or ISP parameter values further comprises generating a frame-based series of values. Outputting the control parameter values to the camera control bus or the ISP parameter values to the ISP further comprises at least one of sequentially providing two or more consecutive values in the frame-based series to a camera control bus controller or ISP in synchronization with actions of a CM associated with exposing a corresponding pair of consecutive frames at the frame rate, or sequentially providing a first value in the frame-based series, and a second value in a second frame-based series, to the camera control bus or ISP in synchronization with actions of the CM associated with exposing the corresponding pair of consecutive frames at the frame rate.

In furtherance of the embodiment above, outputting the control parameter values to the camera control bus or the ISP parameter values to the ISP further comprises providing to the control bus or the ISP a newest value associated with a frame in the window by selecting between the value corresponding to the frame in a first series, and a value corresponding to the frame in a second series, depending on whether the first or second series was received more recently.

In furtherance of the embodiment above, outputting the control parameter values to the camera control bus or the ISP parameter values to the ISP further comprises popping values to a camera control bus controller or to an ISP from a first set of values by indexing through the values on a frame-by-frame basis, receiving a second set of values, and popping values from the second set by indexing through the values on a frame-by-frame basis beginning with the value associated with a lowest frame number in the second set, until another set of values is received.

In furtherance of the second embodiment, the method further includes storing to a memory space the at least one of the automatic focus, automatic exposure, or auto automatic white balance library. The method further includes exposing image data frames at the frame rate based on a received CM control parameter value. The method further includes processing the image data frames based on a received ISP parameter value. The method further includes displaying or storing a representation of the collected image data frames.

In one or more third embodiment, one or more computer-readable storage media, with instructions stored thereon, which when executed by a processor, cause the processor to perform a method. The method performed comprises receiving a call for a digital camera control algorithm. The method performed further comprises accessing at least one of an automatic focus, automatic exposure, or auto automatic white balance library in response to receiving the call. The method performed further comprises generating a set of camera hardware module (CM) control parameter values, or a set of image signal processing (ISP) parameter values, each set including a frame-based series of values determined based on the library, wherein the frame-based series is associated with a window spanning a predetermined number of consecutive image data frames to be exposed, or have been exposed, by a CM at a frame rate.

In furtherance of the third embodiment, the media further comprises instructions stored thereon, which when executed by the processor, further cause the processor to generate sets of CM control parameter values, or ISP parameter values, more frequently than the ratio of the frame rate to the number of frames in each of the sets.

In one or more fourth embodiment, a computer-implemented method of image processing with digital camera control algorithms includes accessing or receiving a set of camera hardware module (CM) control parameter values or ISP parameter values, wherein each set includes a frame-based series of values associated with a window spanning a predetermined number of consecutive image data frames to be exposed, or have been exposed, by a CM at a frame rate. The method includes outputting the control parameter values to a camera control bus or the ISP parameter values to an ISP in synchronization with actions of a CM associated with exposing consecutive image data frames.

In furtherance of the fourth embodiment, outputting the control parameter values to the camera control bus or the ISP parameter values to the ISP further comprises at least one of sequentially providing two or more consecutive values in the frame-based series to the camera control bus or ISP in synchronization with actions of a CM associated with exposing a corresponding pair of consecutive frames at the frame rate, or sequentially providing a first value in the frame-based series, and a second value in a second frame-based series, to the camera control bus or ISP in synchronization with actions of the CM associated with exposing the corresponding pair of consecutive frames at the frame rate.

In furtherance of the fourth embodiment, outputting the control parameter values to the camera control bus or the ISP parameter values to the ISP further comprises providing to the control bus or the ISP a newest value associated with a frame in the window by selecting between the value corresponding to the frame in a first series, and a value corresponding to the frame in a second series, depending on whether the first or second series values was received more recently.

In one or more fifth embodiment, one or more computer-readable storage media, with instructions stored thereon, which when executed by a processor, cause the processor to perform a method. The method performed comprises accessing or receiving a set of camera hardware module (CM) control parameter values or ISP parameter values, wherein each set includes a frame-based series of values associated with a window spanning a predetermined number of consecutive image data frames to be exposed, or have been exposed, by a CM at a frame rate. The method performed further comprises outputting the control parameter values to a camera control bus or the ISP parameter values to an ISP in synchronization with actions of a CM associated with exposing consecutive image data frames.

In furtherance of the fifth embodiment, the media further comprises instructions stored thereon, which when executed by the processor, further cause the processor to perform the method further comprising providing to the control bus or the ISP a newest value associated with a frame in the window by selecting between the value corresponding to the frame in a first series, and a value corresponding to the frame in a second series, depending on whether the first or second series values was received more recently.

In one or more sixth embodiment, one or more computer-readable storage media, with instructions stored thereon, which when executed by a processor, cause the processor to perform any one of the second embodiments.

In one or more sixth embodiment, one or more computer-readable storage media, with instructions stored thereon, which when executed by a processor, cause the processor to perform any one of the fourth embodiments.

In one or more seventh embodiment, a platform for image processing with digital camera control algorithms, the platform comprises an input means for receiving a call for a camera control algorithm. The platform comprises a library means, coupled to the input means, for accessing at least one of an automatic focus, automatic exposure, or auto automatic white balance library in response to the call. The platform comprises a first camera control means, coupled to the library means, for generating a set of camera hardware module (CM) control parameter values, or a set of image signal processing (ISP) parameter values, each set including a frame-based series of values determined based on the library, wherein the frame-based series is associated with a window spanning a predetermined number of consecutive image data frames to be exposed, or have been exposed, by a CM at a frame rate.

In furtherance of the one or more seventh embodiment, the platform further comprises a second camera control means, coupled to the first camera control means, for accessing or receiving the set of camera hardware module (CM) control parameter values or ISP parameter values. The second camera control means further for outputting the control parameter values to a camera control bus or the ISP parameter values to an ISP in synchronization with actions of a CM associated with exposing consecutive image data frames.

In one or more eighth embodiment, a platform for image processing with digital camera control algorithms includes a camera control means for accessing or receiving a set of camera hardware module (CM) control parameter values or ISP parameter values, wherein each set includes a frame-based series of values associated with a window spanning a predetermined number of consecutive image data frames to be exposed, or have been exposed, by a CM at a frame rate. The camera control means is further for\ outputting the control parameter values to a camera control bus or the ISP parameter values to an ISP in synchronization with actions of a CM associated with exposing consecutive image data frames.

In furtherance of the eighth embodiment, outputting the control parameter values to the camera control bus or the ISP parameter values to the ISP further comprises at least one of sequentially providing two or more consecutive values in the frame-based series to the camera control bus or ISP in synchronization with actions of a CM associated with exposing a corresponding pair of consecutive frames at the frame rate, or sequentially providing a first value in the frame-based series, and a second value in a second frame-based series, to the camera control bus or ISP in synchronization with actions of the CM associated with exposing the corresponding pair of consecutive frames at the frame rate.

In one or more ninth embodiment, a platform for image processing with digital camera control algorithms, the platform including a means to perform any one of the second embodiments.

In one or more tenth embodiment, a platform for image processing with digital camera control algorithms, the platform including a means to perform any one of the fourth embodiments.

It will be recognized that the embodiments are not limited to the exemplary embodiments so described, but can be practiced with modification and alteration without departing from the scope of the appended claims. For example, the above embodiments may include specific combination of features. However, the above embodiments are not limited in this regard and, in embodiments, the above embodiments may include undertaking only a subset of such features, undertaking a different order of such features, undertaking a different combination of such features, and/or undertaking additional features than those features explicitly listed. Scope should, therefore, be determined with reference to the appended claims, along with the full scope of equivalents to which such claims are entitled.

What is claimed is:

1. A platform for image processing with digital camera control algorithms, the platform comprising:
   a camera control bus to couple with one or more camera hardware module (CM);
   a soft real-time (SRT) camera controller including logic circuitry to:
   generate a frame-based series of CM control parameter values, the frame-based series associated with a window spanning a predetermined number of consecutive image data frames to be exposed by a CM at a frame rate; and
   a hard real-time (HRT) camera controller coupled to both the SRT controller and the camera control bus, the HRT controller including logic circuitry to:
   receive the control parameter values intermittently from the SRT controller; and
   output the control parameter values to the control bus in synchronization with actions of a CM associated with exposing consecutive image data frames.

2. The platform of claim 1, wherein the HRT controller is to:
   sequentially provide at least two consecutive control parameter values in the frame-based series to the control bus in synchronization with actions of a CM associated with exposing a corresponding pair of consecutive frames at the frame rate; or
   sequentially provide a first value in the frame-based series, and a second value in a second frame-based series, in synchronization with actions of the CM associated with exposing the corresponding pair of consecutive frames at the frame rate.

3. The platform of claim 2, wherein:
   the HRT controller is to provide to the control bus a newest control parameter value associated with a frame in the window by selecting between the control parameter value corresponding to the frame in a first series, and a control parameter value corresponding to the frame in a second series, depending on whether the first or second series of CM control parameter values was received more recently.

4. The platform of claim 1, wherein the HRT controller includes logic circuitry to:
   receive from the SRT controller the CM control parameter values;
   pop control parameter values to the control bus by indexing through the values in the series on a frame-by-frame basis until a second set of control parameter values is received from the SRT controller; and
   pop control parameter values from the second set of control parameter values by indexing through the values on a frame-by-frame basis until another set of control parameter values is received.

5. The platform of claim 1, wherein:
   each frame-based series of CM control parameter values is associated with an exposure value convergence plan and spans a predetermined number of consecutive image data frames to be exposed by a CM at a frame rate; and
   exposure value sets are generated asynchronously with the frame rate; and
   the HRT controller is to:
   receive the sets of exposure values from the SRT controller more frequently than the ratio of the frame rate to the number of frames in each set;
   pop exposure values sequentially to the control bus, at the frame rate, from a first set of values by indexing through the values on a frame-by-frame basis until an updated set of exposure values is received; and
   pop exposure values sequentially to the control bus, at the frame rate, from the updated set of exposure values by indexing through the values on a frame-by-frame basis until the set of control parameter values is updated again.

6. The platform of claim 1, further comprising an image signal processor (ISP) coupled to the HRT controller; and wherein:
   the SRT controller further includes logic circuitry to iteratively generate ISP parameter values; and
   the HRT controller is further coupled to both the SRT controller and the ISP further includes logic circuitry to:
   receive the ISP parameter values intermittently from the SRT controller; and
   incrementally output ISP parameter values to the ISP in synchronization with actions of the ISP associated with processing consecutive image data frames.

7. The platform of claim 6, wherein:
   the SRT controller is to generate a frame-based series of ISP parameter values, or an indication thereof, wherein the frame-based series is associated with a window spanning a predetermined number of consecutive image data frames to be processed by the ISP;
   the HRT controller is to sequentially provide at least two consecutive control parameter values in the frame-based series, or derived from the indication thereof, to the ISP in synchronization with actions of the ISP associated with processing a corresponding pair of consecutive frames.

8. The platform of claim 6, further comprising an image data receiver coupled to an output of one or more CM and to the HRT controller, wherein the image data receiver includes logic circuitry to:
   receive both raw image data for a frame and embedded data indicative of CM control parameters associated with collection of the raw image data; and
   output the raw image data to the ISP and the embedded data to the HRT controller; and
   wherein the HRT controller is further to modify or supplement at least one ISP parameter value based on the embedded data.

9. The platform of claim 1, further comprising:
   the CM to expose image data frames at a frame rate;
   a memory coupled to the SRT controller to store at least one of an automatic exposure or auto automatic white balance library accessed by the SRT controller to generate the CM control parameter values;
   an image signal processor (ISP) coupled to an output of the CM to process the image data frames; and at least one of a display device or storage device coupled downstream of the ISP to display or store a representation of the collected image data frames.

10. A computer-implemented method of image processing with digital camera control algorithms, the method comprising:
receiving a call for a camera control algorithm;
accessing at least one of an automatic focus, automatic exposure, or auto automatic white balance library in response to the call; and
generating a set of camera hardware module (CM) control parameter values, or a set of image signal processing (ISP) parameter values, each set including a frame-based series of values determined based on the library, wherein the frame-based series is associated with a window spanning a predetermined number of consecutive image data frames to be exposed, or that have been exposed, by a CM at a frame rate.

11. The method of claim 10, wherein the generating is iterated in response to each call received and the resulting sets of CM control parameter values, or ISP parameter values, are generated more frequently than the ratio of the frame rate to the number of frames in each of the sets.

12. The method of claim 10, wherein:
receiving the call for a digital camera control algorithm further comprises receiving a call for an automatic exposure control algorithm; and
generating the set of camera hardware module (CM) control parameter values further comprises:
determining an exposure convergence plan, including at least one of target exposure parameters or target total exposures, to provide a smooth change in brightness along a sequence of frames; and
generating a set of exposure values converging from a first exposure to a second exposure over the predetermined number of consecutive image data frames based on the exposure convergence plan.

13. The method of claim 10, further comprising:
accessing or receiving the set of camera hardware module (CM) control parameter values or ISP parameter values; and
outputting the control parameter values to a camera control bus or the ISP parameter values to an ISP in synchronization with actions of a CM associated with exposing consecutive image data frames.

14. The method of claim 13, wherein:
generating the set of CM control parameter values, or ISP parameter values further comprises generating a frame-based series of values; and
outputting the control parameter values to the camera control bus or the ISP parameter values to the ISP further comprises at least one of:
sequentially providing two or more consecutive values in the frame-based series to the camera control bus or ISP in synchronization with actions of a CM associated with exposing a corresponding pair of consecutive frames at the frame rate; or
sequentially providing a first value in the frame-based series, and a second value in a second frame-based series, to the camera control bus or ISP in synchronization with actions of the CM associated with exposing the corresponding pair of consecutive frames at the frame rate.

15. The method of claim 13, wherein outputting the control parameter values to the camera control bus or the ISP parameter values to the ISP further comprises providing to the control bus or the ISP a newest value associated with a frame in the window by selecting between the value corresponding to the frame in a first series, and a value corresponding to the frame in a second series, depending on whether the first or second series was received more recently.

16. The method of claim 13, wherein outputting the control parameter values to the camera control bus or the ISP parameter values to the ISP further comprises:
popping values to a camera control bus controller or to an ISP from a first set of values by indexing through the values on a frame-by-frame basis;
receiving a second set of values; and
popping values from the second set by indexing through the values on a frame-by-frame basis beginning with the value associated with a lowest frame number in the second set, until another set of values is received.

17. The method of claim 13, further comprising:
storing to a memory space the at least one of the automatic focus, automatic exposure, or auto automatic white balance library;
exposing image data frames at the frame rate based on a received CM control parameter value;
processing the image data frames based on a received ISP parameter value; and
displaying or storing a representation of the collected image data frames.

18. One or more non-transitory computer-readable storage media, with instructions stored thereon, which when executed by a processor, cause the processor to perform a method comprising:
receiving a call for a digital camera control algorithm;
accessing at least one of an automatic focus, automatic exposure, or auto automatic white balance library in response to receiving the call; and
generating a set of camera hardware module (CM) control parameter values, or a set of image signal processing (ISP) parameter values, each set including a frame-based series of values determined based on the library, wherein the frame-based series is associated with a window spanning a predetermined number of consecutive image data frames to be exposed, or that have been exposed, by a CM at a frame rate.

19. The media of claim 18, further comprising instructions stored thereon, which when executed by the processor, further cause the processor to generate sets of CM control parameter values, or ISP parameter values, more frequently than the ratio of the frame rate to the number of frames in each of the sets.

20. A computer-implemented method of image processing with digital camera control algorithms, the method comprising:
accessing or receiving a set of camera hardware module (CM) control parameter values or ISP parameter values, wherein each set includes a frame-based series of values associated with a window spanning a predetermined number of consecutive image data frames to be exposed, or that have been exposed, by a CM at a frame rate; and
outputting the control parameter values to a camera control bus, or the ISP parameter values to an ISP, in synchronization with actions of a CM associated with exposing consecutive image data frames.

21. The method of claim 20, wherein:
outputting the control parameter values to the camera control bus, or the ISP parameter values to the ISP, further comprises at least one of:

sequentially providing two or more consecutive values in the frame-based series to the camera control bus or ISP in synchronization with actions of a CM associated with exposing a corresponding pair of consecutive frames at the frame rate; or sequentially providing a first value in the frame-based series, and a second value in a second frame-based series, to the camera control bus or ISP in synchronization with actions of the CM associated with exposing the corresponding pair of consecutive frames at the frame rate.

22. The method of claim 20, wherein outputting the control parameter values to the camera control bus or the ISP parameter values to the ISP further comprises providing to the control bus or the ISP a newest value associated with a frame in the window by selecting between the value corresponding to the frame in a first series, and a value corresponding to the frame in a second series, depending on whether the first or second series values was received more recently.

* * * * *